United States Patent [19]
Raythatha

[11] Patent Number: 4,806,167
[45] Date of Patent: Feb. 21, 1989

[54] KAOLIN AGGREGATION USING COMBINATION OF ORGANIC AND INORGANIC BASES

[75] Inventor: Rasik H. Raythatha, Tennille, Ga.

[73] Assignee: E.C.C. America Inc., Atlanta, Ga.

[21] Appl. No.: 43,214

[22] Filed: Apr. 27, 1987

Related U.S. Application Data

[63] Continuation-in-part of Ser. No. 918,632, Oct. 14, 1986, and a continuation-in-part of Ser. No. 1,889, Jan. 9, 1987.

[51] Int. Cl.$^4$ .................. C04B 14/00; C04B 33/04; D21H 1/10; C09C 3/00
[52] U.S. Cl. .................. 106/465; 501/146; 501/147; 501/150; 501/148; 427/391; 427/361; 428/688; 428/446; 428/537.5; 162/135; 162/181.6; 162/181.8; 162/181.7; 106/463; 106/468; 106/487; 106/499
[58] Field of Search .............. 106/288 B, 288 R, 309, 106/308 C, 308 Q, 308 P, 308 M, 306, 308 R; 501/146, 150, 147; 427/391, 361; 428/688, 446, 537.5; 162/135, 181.6, 181.8

[56] References Cited

U.S. PATENT DOCUMENTS

| 4,299,807 | 11/1981 | Angel et al. | 501/150 |
| 4,419,228 | 12/1983 | Cook et al. | 501/150 |
| 4,650,521 | 3/1987 | Kappelman et al. | 501/147 |
| 4,738,726 | 4/1988 | Pratt et al. | 501/147 |

FOREIGN PATENT DOCUMENTS

| 1176466 | 8/1964 | Fed. Rep. of Germany ... 162/181.6 |
| 2049310 | 4/1977 | Japan . |
| 0652253 | 3/1979 | U.S.S.R. . |
| 1131951 | 12/1984 | U.S.S.R. . |

Primary Examiner—Howard E. Schain
Assistant Examiner—Garnette D. Draper
Attorney, Agent, or Firm—Klauber & Jackson

[57] ABSTRACT

The invention relates to an aggregated kaolinitic pigment having improved physical and optical characteristics when incorporated as a filler or coating pigment in paper. The pigment may be produced by treating a particulate kaolin with an alkaline earth metal carbonate or hydroxide or alkali metal carbonate, and urea or an organic amine. The pigment consists of porous aggregates of kaolin particles.

13 Claims, 7 Drawing Sheets

KAOLIN AGGREGATION USING COMBINATION OF ORGANIC AND INORGANIC BASES

This application is a continuation-in-part of commonly assigned U.S. patent applications, Ser. No. 918,632 filed Oct. 14, 1986, and Ser. No. 001,889, filed Jan. 9, 1987.

BACKGROUND OF THE INVENTION

Kaolinite based pigments are commonly used in paper industries for paper filling and paper coating applications. In general, the objectives of using the pigment are to improve paper qualities, such as opacity, brightness, smoothness, printing, porosity, surface coverage, light scatter, and to reduce the cost of paper manufacturing.

Both the brightness characteristics of the given kaolin and the opacifying properties of same when incorporated as a filler in paper, may be quantitatively related to a property of the filler identified as the "scattering coefficient S." The said parameter, i.e., the scattering coefficient S of a given filler pigment, is a property well-known and extensively utilized in the paper technology art, and has been the subject of numerous technical papers and the like. The early exposition of such measurements was made by Kubelka and Munk, and is reported in Z. Tech Physik 12:539 (1931). Further citations to the applicable measurement techniques and detailed definitions of the said scattering coefficient are set forth at numerous places in the patent and technical literature. Reference may usefully be had in this connection, e.g., to U.S. Pat. Nos. 4,026,726 and 4,028,173. In addition to the citations set forth in these patents, reference may further be had to Pulp and Paper Science Technology Vol. 2 "Paper," Chapter 3, by H. C. Schwalbe (McGraw-Hill Book Company, N.Y.).

In a filled paper, higher light scattering is therefore important. Increased light scatter allows paper to look more opaque without increasing light absorption. The use of pigment with a higher light scattering coefficient allows reduction in either the basis weight or amount of filler required to achieve targeted properties, for example, opacity and brightness. Traditionally, this has been achieved using titanium dioxide, calcined clays and precipitated calcium carbonate. The relatively higher light scattering of titanium dioxide is due to higher refractive index. Higher light scatter observed with calcined kaolin and precipitated calcium carbonate is believed to be due to the intrinsic porous structure developed during the process of manufacturing of these pigments. See McConnell et al, U.S. Pat. No. 4,381,948.

In general, the attempt to increase light scatter by modification of kaolinite mineral also induces some increase in pore void volume. In addition, such modification can produce pigments with particle size distribution in a fairly narrow range. For example, calcining of fine kaolinite above its dehydroxylation point can produce a product with increased pore void volume. In U.S. Ser. No. 918,632 filed Oct. 14, 1986, similar aggregation is achieved chemically by reacting fine kaolinite clay with rapidly hydrolyzing metal chlorides. The acidic by-product of this reaction may be neutralied with gaseous ammonia. The light scattering coefficient and pore void volumes of these clays are significantly higher than the starting kaolinite material. Marginal increase in light scatter (generally less than 10 units) may be induced by mixing kaolinite particles of different size or by chemical flocculation. However, these structures are generally unstable and would break down under high shear stress of paper making or paper coating.

Aside from use as fillers, the aggregated pigments are used in paper coating to improve surface coverage. The application of such pigments can lead to a smoother surface, higher porosity, gloss and print properties. In the said patent application a chemically aggregated kaolin pigment is shown to significantly increase coated sheet properties, especially paper and print gloss.

In more detail, in U.S. Pat. No. 4,381,948 to A. D. McConnell et al, a calcined kaolin pigment is disclosed and a method for manufacture of same. The said pigment consists of porous aggregates of kaolin platelets, and exhibits exceptionally high light scattering characteristics when incorporated as a filler in paper. This pigment, which substantially corresponds to the commercially available product ALPHATEX® of the present assignee, E.C.C. America Inc. (Atlanta, Georgia), is prepared by first blunging and dispersing an appropriate crude kaolin to form an aqueous dispersion of same. The blunged and dispersed aqueous slurry is subjected to a particle size separation from which there is recovered a slurry of the clay, which includes a very fine particle size; e.g. substantially all particles can be smaller than 1 micrometer E.S.D. The slurry is dried to produce a relatively moisture-free clay, which is then thoroughly pulverized to break up agglomerates. This material is then used as a feed to a calciner; such feed is calcined under carefully controlled conditions to typical temperatures of at least 900° C. The resulting product is cooled and pulverized to provide a pigment of the porous high light scattering aggregates of kaolin platelets as described.

Calcined kaolin products, including those of the aforementioned ALPHATEX® type, are seen to be manufactured by relatively complex techniques involving a multiplicity of steps, including specifically a calcining step, plus various preparatory steps and post-calcining steps. Thus, the said product is relatively expensive to produce; and requires considerable investment in complex apparatus and the like—e.g. highly regulated calciners, etc. It can indeed be noted that the conditions of preparation of these materials must be very carefully controlled in order to keep abrasion acceptably low in the calcined product. For example, the calcination operation tends per se to produce an abrasive product—in consequence of overheating—if great care is not taken to preclude such a result.

It is further to be noted that in order to produce a low abrasion calcined product, the particle size in the feed to the calciner must be carefully controlled—even a relatively small increase in coarseness of such feed can have very marked detrimental effect on Valley abrasion.

In U.S. Ser. No. 918,632 filed Oct. 14, 1986, a process is disclosed in which a fine particle size kaolin is reacted in particulate form with a metal chloride, such as silicon tetrachloride, to form a chemically aggregated structured kaolin pigment. The metal chloride may be one or more of the chlorides having the general formula $MCl_x$, where M is Si, Ti or Al; and X is 3 or 4 depending on the valence of M. Heating may optionally be used to shorten the reaction time. When so used, temperatures generally will not, however, exceed about 150° C. In order to complete the polymerization and condensation which is thought to occur, it is preferable to age the resulting product for a period, typically at least three days. In another aspect of that process, additional improvements in the products are found to occur by the addition of ammonia to the combined kaolin and metal chloride.

In accordance with the foregoing, it may be regarded as an object of the present invention, to provide an aggregated kaolin pigment product, which possesses improved light scattering characteristics, and hence is useful, as an opacifier and light scattering filler for paper and paper products, and which may similarly be used in other paper manufacturing applications, including in the coating of same.

It is also an object of the invention to provide improved coated papers and paperboard products for printing purposes such as for offset printing, gravure printing and other types of printing, using an aggregated kaolin pigment.

It is a further object of the present invention, to provide a pigment product of the foregoing character, which is prepared without calcination and therefore without subjecting the kaolin to high temperatures, and which accordingly possesses low abrasiveness in accordance with the kaolin feed from which it is produced It is a yet further object of the invention, to provide a pigmentary product of the foregoing character, which is composed of aggregates of minute kaolin particles which are bonded together chemically, i.e. without the use of calcination or other high temperature techniques.

It is a still further object of the invention to provide a high light scattering pigmentary kaolin product, which may be produced at lower costs than calcined kaolins, and which can therefore provide a lower cost replacement for many applications in which calcined kaolin product or other high cost fillers are presently utilized.

It is a yet further object of the present invention, to provide a process for producing aggregated kaolin pigments as aforementioned, which consists of a minimal number of simply conducted steps, which utilize relatively simple and inexpensive apparatus, and which introduce minimal foreign elements into the final product produced by same.

A still further object of the invention is to provide a process for producing aggregated kaolin pigments as aforementioned, from a feed crude containing high percentages of extremely minute particles, e.g., less than 0.25 micrometers, to thereby convert a crude having limited value to the paper maker to one which can be readily and economically used in paper products.

A yet further object of the invention, is to provide a process as aforementioned, which enables low abrasion aggregated kaolin pigments to be produced from coarser process feeds than can normally be employed in calcination to produce a product of comparable low abrasion.

It is a yet further object of the invention to provide a process for producing a pigmentary high light scattering kaolin product, which does not utilize metal chlorides, and which may be carried out without the use of a calcining step or of other high temperature processing conditions or equipment.

SUMMARY OF THE INVENTION

The present invention describes methods of producing aggregated kaolin pigments, using a combination of organic and inorganic bases. In the process dried kaolin mineral is blended with inorganic bases such as alkali and alkaline earth metal carbonates, or alkaline earth metal hydroxides, and organic bases such as amines.

The resulting products exhibit increased light scatter, improved relative sedimentation volume and bulk. The aggregates appear to have a structure that is strong enough to withstand the high shear forces of paper making.

A synergistic enhancement of light scatter has been demonstrated in Examples VII to XV of U.S. Pat. Ser No. 918,632 filed Oct. 14, 1986, by addition of alkali metal carbonates or hydroxides, e.g. ground calcium carbonate, to the fine kaolinite clay feed used in the processes thereof. It has now been found that this synergistic effect is enhanced even furher in the presence of urea or organic amines.

An improvement in light scatter is obtained without calcination and also without $SiCl_4$ (or other metal chloride) addition. It may also be obtained without ammonia addition, thus avoiding the handling of gaseous ammonia. This results in a greatly simplified but effective treatment process.

Thus, it has now been found that, surprisingly, there is an enhancement of light scatter by addition to a fine kaolinite clay, of an aggregation enhancement agent selected from one or more members of the group consisting of alkali metal carbonates, and alkaline earth metal carbonates and hydroxides, plus an organic amine; without either calcination of the clay or $SiCl_4$ (or other metal chloride) addition.

It is believed that the resulting kaoli is aggregated, i.e. that aggregates are formed from minute kaolin particles or platelets. That aggregates are formed can be assumed from the light scatter data. The precise mechanism by which the particles aggregates is at present not understood.

The aggregation enhancing agent mixed with the kaolin preferably should provide from about 5 to 120 millimoles of alkaline earth metal or lithium ions per 100 parts by weight of kaolin. This equates to from about 0.5 to 12% by weight kaolin of a particulate alkaline earth metal carbonate or hydroxide or alkali metal carbonate. Where the particularly preferred calcium carbonate or hydroxide is used, a more preferable addition range is from about 1.5 to 4% by weight of kaolin.

Coarse calcium carbonates or hydroxides are less effective in the present invention, where it is preferable rather to use the so-called paper grades of fine ground or precipitated calcium carbonate, i.e. the grades of same which are used for paper filling and paper coating. A suitable material for use in the process of the invention is the CARBITAL 50 or CARBITAL 90 product of Atlantic Carbonates of Baltimore, Maryland. These products have, respectively, particle size distribution such that 50 and 90% thereof by weight are of less than 2 microns E.S.D.

A liquid or solid amine may be used, which may be aliphatic or cyclic, preferably a liquid or solid mono- or polyfunctional amine containing 2 to 6 carbon atoms. The amount of urea or amine added may be about 1 weight percent based on the weight of kaolin feed with a more general range being from about 0.25% to about 2%. As the higher amounts of, say, 2%, are reached, the brightness begins to drop. Thus, a typical addition range for the amines is from 8 to 20 lbs. per ton of kaolin feed. Where liquid amines are used, 8 to 16 lbs. per ton of feed is preferable.

Urea is preferably added in the range of 10 to 20 lbs. per ton of feed. Preferred amines include diethylenetriamine, ethylenediamine, and hexamethylenetetramine.

It is preferable in order to obtain high light scattering characteristics, to utilize in the process of the invention a fine particle size kaolin, preferably one in which the particle size distribution is such that from about 70 to about 100% by weight of same are of less than one micrometer E.S.D. (equivalent spherical diameter). Where the pigment is primarily of interest for use as a filler (as opposed to use in paper coating) and where light scattering qualities are not a primary consideration, coarser feeds can be effectively utilized, e.g., up to 70% by weight less than 2 micrometers E.S.D. Particle size determinations as set forth herein are determined by Sedigraph analysis, i.e., by the instrument of such type available from Micromeritics Instrument Corporation of Norgross, Georgia.

The kaolin utilized as a feed for the invention, can be the product of wet processing, wherein various conventional beneficiation steps known to kaolin wet processing are utilized; or in accordance with a further aspect of the invention, the kaolin can be the product of air classifying a kaolin crude, preferably to at least 88% less than two micrometers—depending upon the light scattering characteristics desired in the final product; except that where the product of the invention is to be used in coating formulations, the classification is preferably to at least 94% less than 2 micrometers.

When used in paper coating applications, the structured kaolin pigments of the invention comprise from about 5 to 60% and preferably from about 10 to 30% by weight of the total pigment component of the coating composition. The balance of the pigment can comprise any of the known coating pigments, such as coating grades of kaolins, calcium carbonate, titanium dioxide, plastic pigments, etc. The coating compositions, in addition to the pigment component, include conventional components, such as an adhesive binder, dispersants, and other known additives.

The conditions of treatment include room temperature. Heating may optionally be used. When so used, temperatures generally will not, however, exceed about 150° C. It is preferable to age the resulting product for a period, typically of at least 3 days.

In the ensuing description, all scattering data are normalized by comparison to the scattering coefficient of samples of the aforementioned Alphatex®. Ideally in a study of the present nature, the same batch of beaten pulp should be used throughout. As this is not practical, the method adopted was to fill one set of sheets in each series of tests using the same Alphatex® from series to series. Statistically, the Alphatex® filled samples at 10% filler had a scattering coefficient of 680 cm$^2$/gram, and in each series in which Alphatex® differed from 680, the scattering coefficients of the experimental samples were accordingly adjusted proportionally to the adjustments which the Alphatex®-containing paper required to bring its value to 80 cm$^2$/gram. This procedure, which was used in subsequent examples, is from time to time referred to in the specification as "normalizing" the scattering coefficients.

DETAILED DESCRIPTION

Figure 1:
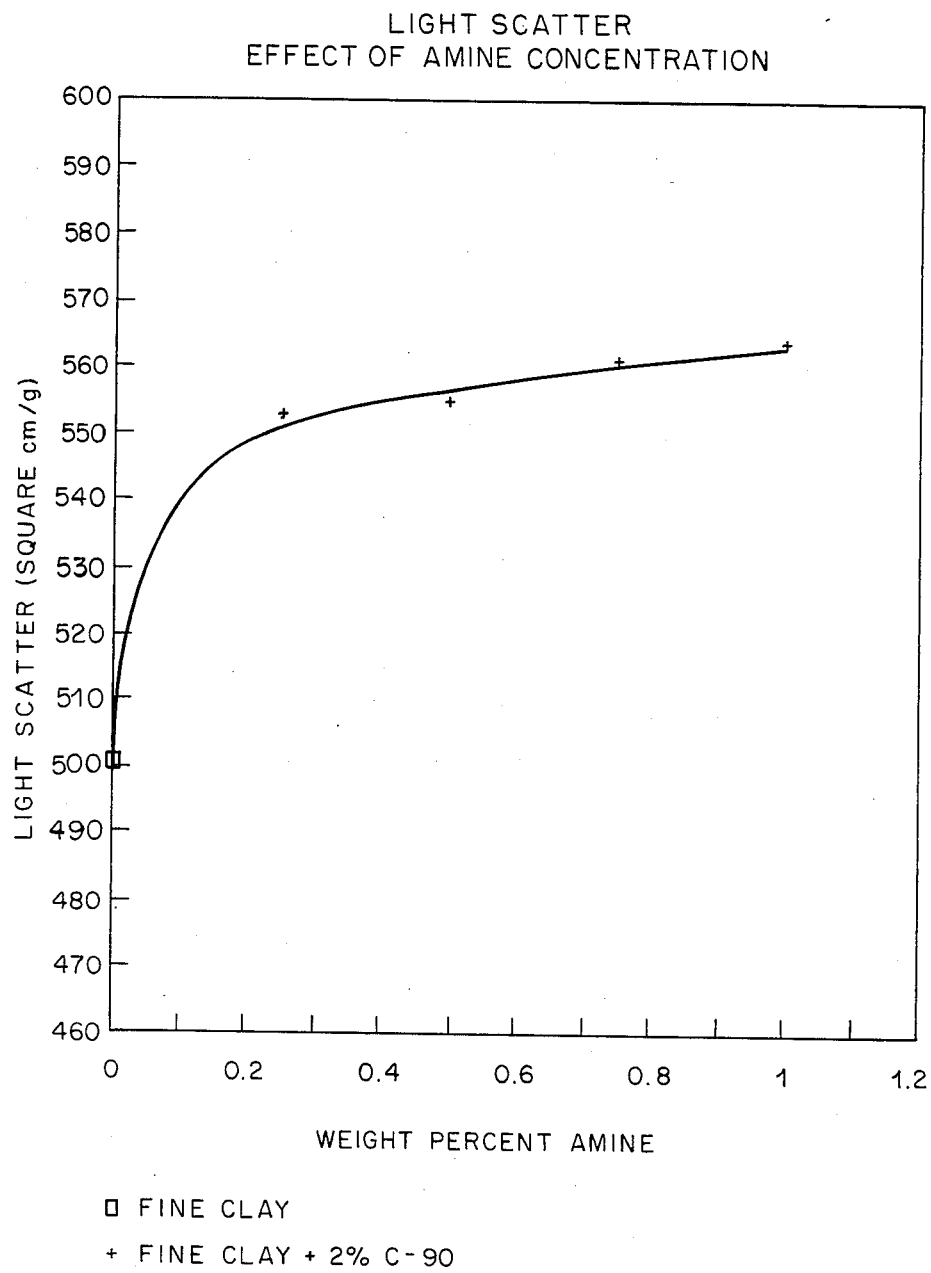
In FIG. 1, the light scatter of filled paper is plotted against the amount of diethylenetriamine used.

General Methods of Preparation of Feed Clay

The starting crude material was a blend of crude kaolins, which were derived from northeast Georgia, and which were comprised of very fine particle size materials. The GE brightness of the said crude was in the range of 82 to 87. In all instances in this specification it will be understood that brightness values are obtained according to the standard specification established by TAPPI procedure T-646 os-75.

The crude clays were beneficiated according to the general practice used in kaolinite processing industries. The beneficiated clays were classified by centrifugation to 94% less than 2 micrometer E.S.D. (equivalent spherical diameter). The classified clays were flocculated using 0.25% by weight of aluminum sulfate and adjusting the pH to 3.5 with sulfuric acid. The flocculated kaolinites were filtered. The significantly dried (about 20% moisture remains) kaolinites were redispersed with 0.25% by weight of sodium polyacrylate and the pH adjusted to about 7.0. The redispersed kaolinite was spray dried, being referred to herein as "Control-I." This also corresponds to the commercial product Betagloss® of the assignee E.C.C. America Inc. (Atlanta, Georgia). In many instances one component of the desired bases was added prior to spray drying. The moisture content of the spray dried kaolinite was about 1.0% by weight.

Standard Method of Relative Sedimentation Volume Measurement

The relative sedimentation volume of treated and starting material was measured to determine the extent and nature of aggregation. In the procedure, a nearly 55% solids slurry of pigment was prepared that contained 0.3 milliliter of sodium polyacrylate. This slurry was then spun at 7000 rpm for 45 minutes. The sediment volume was calculated using dry weight of clay, wet weight of clay, and calculating volume of clay using density of dry clay of 2.6 g/ml.

EXAMPLES

Example I

The spray dried blend, Control-I, of fine kaolinite was pulverized by a pulverizer manufactured by Mikropul Corporation. 200 gms of this pulverized clay was mixed with 3% by weight of ground calcium carbonate. The ground calcium carbonate, C-90, (CARBITAL 90) was supplied by Atlantic Carbonate, a division of E.C.C. America, as a 75%. solids slurry. This material was dried at 150° C. for 5 minutes and pulverized once more. This is designated as Feed Clay-I and also as Product-I. The light scatter of a paper filled at 10% filler level with this product is compared with Control-I in Table 1.

Example II

The Feed Clay-II was prepared as described in Example I, except this time the amount of calcium carbonate was 2% by weight. This is designated as Feed Clay-II and also as Product-II. The light scatter of a paper filled at 10% filler level with Product-II is presented in Table 2.

Example III

The Feed Clay-I was prepared as described in Example I. 100 g of dry Feed Clay-I was mixed with 1.0% by weight of ethylenediamine (supplied by Aldrich) in a Waring Blender for one minute to give Product-III. Product-III was tested in paper filling The light scatter of filled sheet, at 10% filler loading, is presented in Table 1.

Example IV

Feed Clay-II was prepared as described in Example II. The dry feed Clay-II was mixed with varying amounts of diethylenetriamine triamine (Aldrich Chemical 6) in a Waring blender.

The amount of amine used ranged from 0.0, 0.25, 0.5, 0.75 to 1.0% by weight of the feed clay. The light scatter of filled sheet, using this aggregated kaolinite, increased steadily with the amount of amine up to 0.75% by weight and attained a plateau. The light scatter of filled paper is illustrated in FIG. 1 against the amount of diethylenetriamine.

Example V

Figure 2:
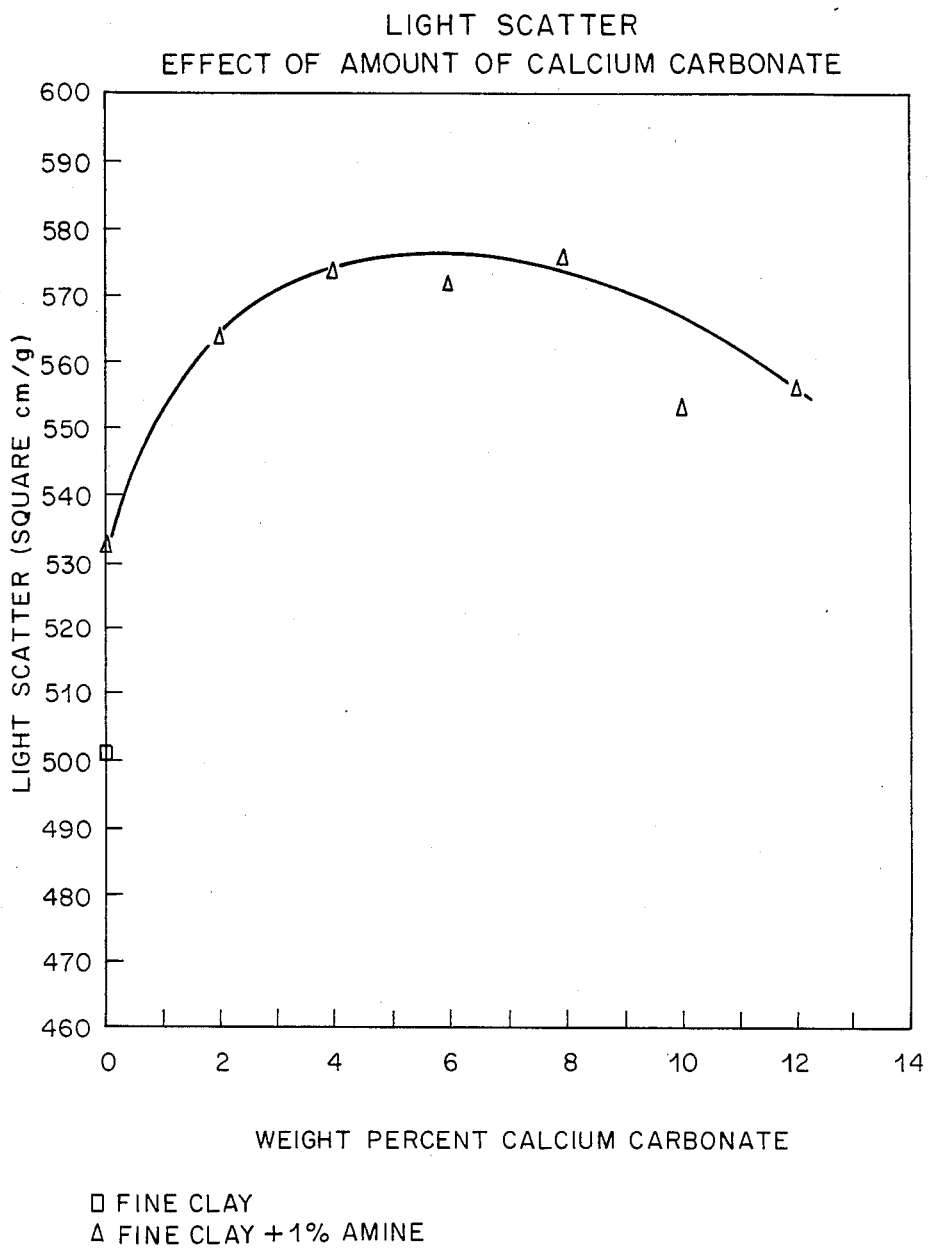
In FIG. 2, the light scatter of filled paper is plotted against the amount of calcium carbonate used.

First a series of kaolinites was prepared by mixing Control-I with varying amounts of ground calcium carbonate as in Example I. The amount of calcium carbonate was 2.0, 4,0, 6.0, 8.0, 10.0 and 12.0% by weight of the clay. These clays were then treated with a fixed amount, 1% by weight, of diethylenetriamine in a Waring blender as in Example IV. The final products were tested in hand sheets for light scatter. Light scatter of paper increased monotonically with calcium carbonate until about 10% by weight of C-90 and then decreased slightly at 12%. These phenomena are illustrated in FIG. 2.

Example VI

A Feed Clay-III was prepared using a blend of fine kaolinite. In the preparation, beneficiation, classification, filtration and redispersion processes were identical to those described in the general method of feed clay preparation given above. However, after redispersion of the clay it was dosed with 4% by weight of ground calcium carbonate, i.e., prior to spray drying. This slurry was spray dried and pulverized using a mill manufactured by Mikropul Corporation. This is referred to as Feed Clay-III. The moisture of the Feed Clay-III was less than 1.0% by weight and brightness was in the range of 87%. This dry Feed Clay-III was reacted with 0.75% by weight of diethylenetriamine in a Waring blender to give Product IV. The treated clay was tested in a paper filling application. The results of light scatter are provided in Table 3.

Example VII

Feed Clay-II was prepared as described in Example II. The dry Feed Clay-II was treated with 1.0% by weight of ethanolamine (a hydroxyl amine supplied by Aldrich Chemical Co.) in a Waring blender according to Example III. The light scatter measured of paper filled at 10% filler loading is presented in Table 4.

Example VIII

The procedure and feed clay were similar to those described in Example VII except this time the amine was a very short chain dimethylamine (Aldrich Chemical Co.). The light scatter values of filled paper are shown in Table 4.

Example IX

The procedure and the feed clay were similar to those described in Example VII, except this time the amine was a very long chain hexylamine (Kodak Chemical Co.). The light scatter data of the treated sample is provided in Table 4.

Example X

Figure 3:
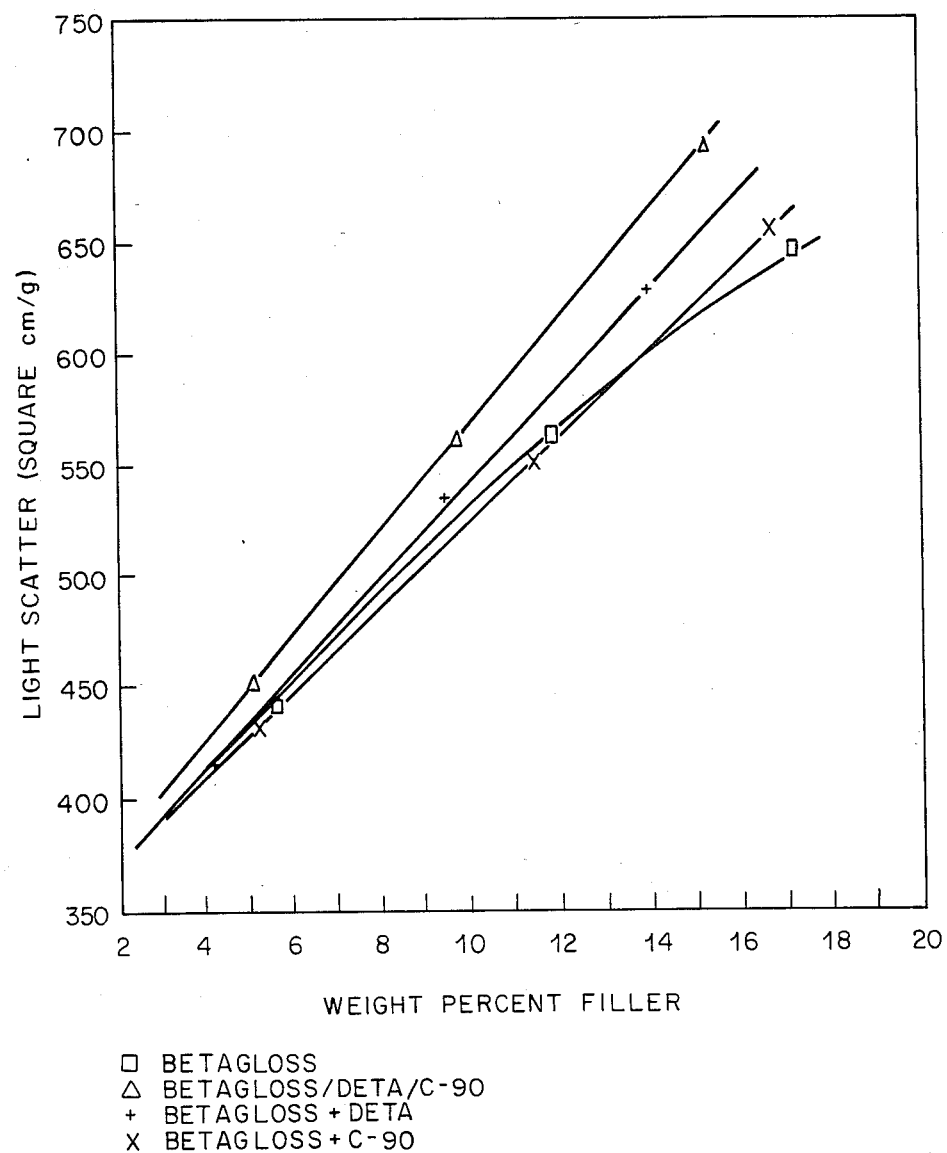
In FIGS. 3, 4 and 5 the light scatter, opacity and burst strength respectively are plotted against filler loading for papers filled according to the invention compared with a kaolinite control filler.
Figure 4:
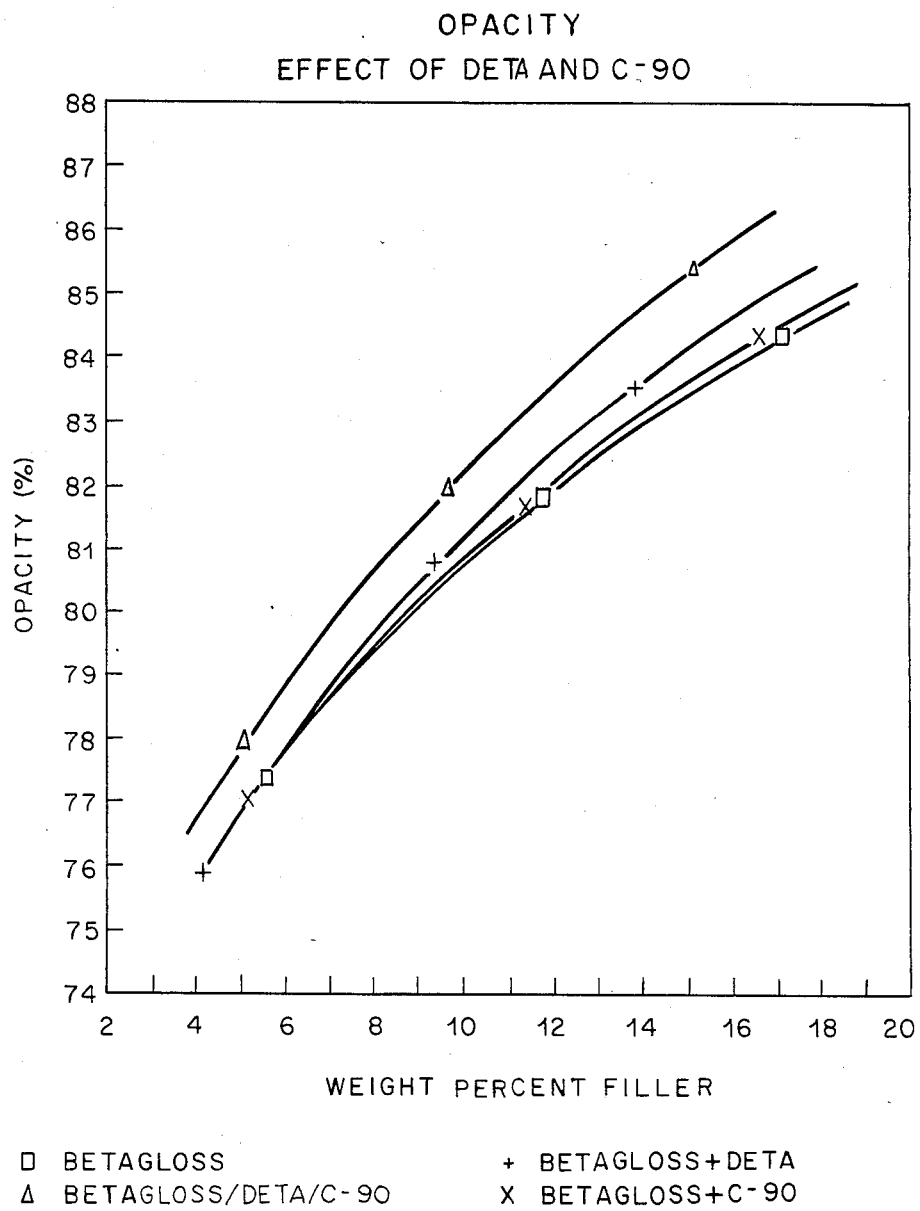
Figure 5:
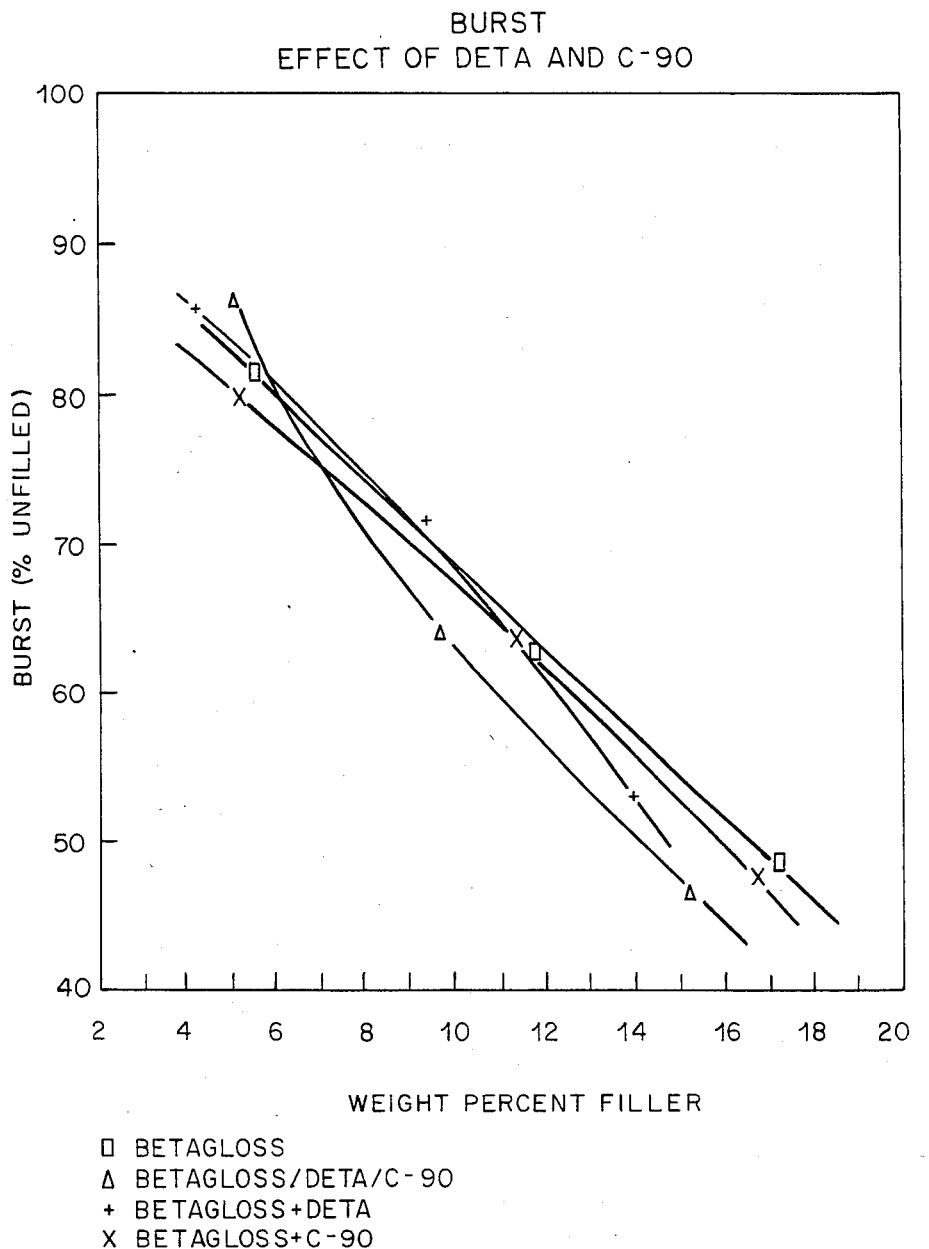
Figure 6:
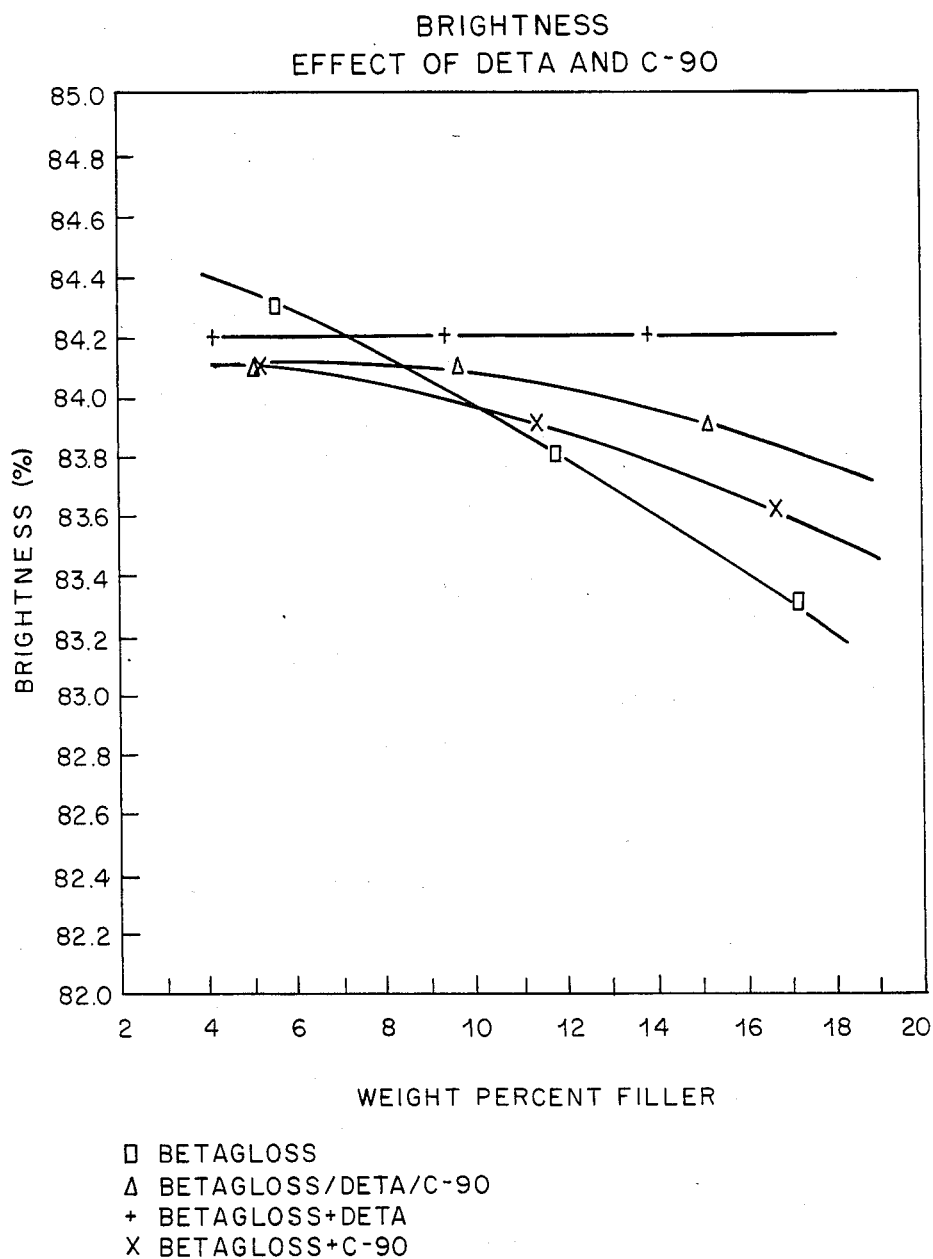
In FIG. 6 brightness is plotted against weight percent filler.

The feed clay and treatment procedure were identical to those described in Example VII, except that the organic base was an aliphatic amine, DETA, diethylenetriamine (Aldrich Chemical Co.). This amine contains two primary and one secondary amine group. The light scatter, opacity and burst strength of paper filled with this treated clay vs. filler loading are compared with Control-I, see FIGS. 3, 4, and 5.

Example XI

The feed clay and the treatment were identical to those described in Example VII. However, the organic base this time was a longer, aliphatic triethylenetetramine, (Aldrich Chemical Co.). This amine contains two secondary and two primary groups. The light scatter of this product at 10% filler level in a filled paper is presented in Table 4.

Example XII 100 g of Feed Clay-I was treated with 0.4% by weight of hexmethylenetetramine (Aldrich Chemical Co.) according to Example III. Hexamethylenetetramine is a cyclic amine. All amino functions are tertiary in nature. The product of this reaction gave nearly a 31 scatter unit increase at 10% filler loading compared to Control-I, see Table 5.

Example XIII

Dry Control-I was reacted with 0.4% by weight of hexamethylenetetramine in a high speed mixer. The treatment leads to about a 13 unit increase in light scatter of filled hand sheets, see Table 5.

Example XIV

A feed clay was prepared according to Example V. However, this time the amount of calcium carbonate was 2.0% by weight. This feed clay was separately reacted with 0.4 and 0.8% by weight of ethylenediamine. The resultant products showed an increase of 28 and 40 light scatter units at 10% filler loading respectively, see Table 6.

Example XV

In this case Control-I was treated with 0.8% by weight of ethylenediamine in a Waring blender. The light scatter of paper filled at 10% loading showed about a twenty unit increase in scatter compared to Control-I, see Table 6.

Example XVI

Feed Clay-IV was prepared according to Example II, except that this time the inorganic base. was 3% barium carbonate (Fisher Scientific Co.). The Feed Clay-IV was then treated with 0.75% by weight of ethylenediamine in a high speed mixer. The product showed nearly a 13 percent unit increase in relative sedimentation volume (RSV). There is a 39 unit increase in light scatter for paper filled at 10% filler loading with this product, see Table 7.

Example XVII

Feed Clay-IV prepared according to Example XVI was treated with 0.75% by weight of diethylenetriamine in a high speed mixer. The treated product showed nearly a 14 percent unit increase in RSV and a 37 unit increase in light scatter compared to Control-I, see Table 7.

Example XVIII

Feed Clay-V was prepared according to Example XVI except this time the inorganic base was 3% by weight of magnesium carbonate. The Feed Clay-V was treated with 0.75% by weight of ethylenediamine as in Example XVI. The product showed about a 10% unit increase in RSV and 47 in light scatter units increase, see Tables 7 and 8.

Example XIX

Feed Clay-V was treated with 0.75% by weight of diethyletriamine as in Example XVII. The resultant products exhibited a 14% unit increase in RSV and a 43 unit light scatter increase, see Tables 7 and 8.

Example XX

Feed Clay-VI was prepared according to Example XVI except this time the inorganic base was sodium carbonate (J. T. Baker Co.). The Feed Clay-VI was treated with 0.75% by weight of ethylenediamine as in Example XVI. The resultant product showed a 9% unit increase in RSV and a 28 unit light scatter increase, see Tables 7 and 8.

Example XXI

Feed Clay-VI was treated with 0.75% by weight of diethylenetriamine according to Example XVII. The resultant product exhibited a 13% unit increase in RSV and a 22 unit light scatter increase, see Tables 7 and 8.

Example XXII

Feed Clay-II was prepared according to Example XVI except this time the inorganic base was 3% by weight of calcium hydroxide (J. T. Baker Co.). The Feed Clay VII was reacted separately with 0.75% by weight of ethylenediamine and diethylenetriamine as in Example XVI and XVII respectively. The resultant products had a 14 and 9 percent unit higher RSV respectively, see Table 9.

Example XXIII

Feed Clay-VIII was prepared according to Example XVI except this time the inorganic base was 3% by weight of magnesium hydroxide (Fisher Scientific Co.). The Feed Clay VIII was treated separately with 0.75% by weight of ethylenediamine and diethylenetriamine as in Example XXII. The resultant products had a 9 and 13% unit higher RSV respectively, see Table 9.

Example XXIV

Chemical Aggregation in Presence of Short Chain Organic Base, Urea

A blend of kaolinite, after beneficiation and spray drying, was pulverized using a laboratory pulverizer, and is referred to as Control-I. The pulverized clay was mixed with 3% by weight of ground calcium carbonate, supplied by the Atlantic Carbonate Corporation in a 75 weight percent slurry. The mixture was dried in an oven at 150° C. for 15 minutes and pulverized once more, being referred to as Feed Clay IX. The dried feed clay was then mixed with 1.5% by weight of finely ground urea, supplied by Fisher Scientific Products. A similar experiment was carried out using 1.0% urea as solid organic base. The light scatter results are provided in Table 10.

Example XXV

Feed Clay VII was prepared according to Example XXII. This clay was reacted with 1.0% urea solution (prepared using 50:50 mixture of water and ethanol) in a Waring blender. The resulting material was dried at 150° C. for 5 minutes. The relative sedimentation volume of this product is provided in Table 9.

Example XXVI

Figure 7:
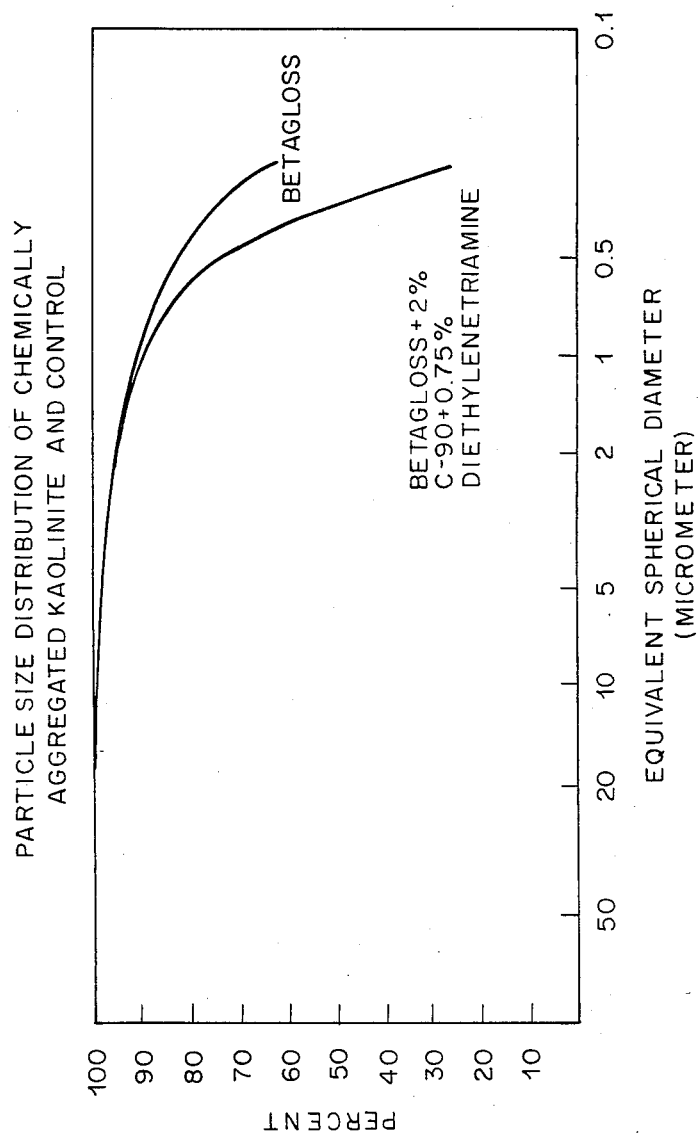
In FIG. 7 are illustrated particle size distribution of a representative starting feed clay and the resultant product yielded by practice of the invention.

This example illustrates particle size distribution for a starting clay and for the aggregated product resulting from same when subjected to the process of the invention. The starting clay was Control-I (as previously defined). Control-I was pulverized and blended with 2% by weight of ground calcium carbonate (90% less than 2 microns). This feed was identical to that in Example II. This was treated with 0.75% by weight of diethylenetriamine. The product was dried at 150° C. for 15 minutes, and its p.s.d. determined by Sedigraph analysis. The p.s.d. curves for the Control-I clay and the product of the invention are shown in FIG. 7. This shows that the process of the invention leads to coarsening of the feed clay at the fine end of the p.s.d., indicating formation of aggregated structures.

TABLE 1

Normalized light scatter of kaolinite aggregated by blending it with ground calcium carbonate and ethylenediamine:

| Material | Light Scatter at 10% Filler Loading |
|---|---|
| Betagloss (Control-I) | 516 |
| Betagloss + 3% Calcium Carbonate (Product-I) | 543 |
| Betagloss + 3% Calcium Carbonate + 1.0% Ethylenediamine (Product-III) | 569 |

TABLE 2

Normalized scatter of kaolinite aggregated by application of calcium carbonate:

| Material | Light Scatter at 10% Filler Loading |
|---|---|
| Betagloss | 503 |
| Betagloss + 2% Calcium Carbonate | 522 |

TABLE 3

Normalized light scatter of kaolinite aggregated by application of calcium carbonate and diethylenetriamine:

| Material | Light Scatter at 10% Filler Loading |
|---|---|
| Betagloss | 509 |
| Betagloss + 4% C-90 | 528 |
| Betagloss + 4% C-90 + 0.75% Diethylenetriamine | 551 |

TABLE 4

Normalized light scatter of chemically aggregated kaolinites by application of calcium carbonate in conjunction with various organic amines:

| Material | Light Scatter at 10% Filler Loading |
|---|---|
| Betagloss + 2% Calcium Carbonate | 522 |
| Betagloss + 1% Hexylamine | 534 |
| Betagloss + 2% Calcium Carbonate + 1.0% Hexylamine | 535 |
| Betagloss + 1% Ethanolamine | 531 |
| Betagloss + 2% Calcium Carbonate + 1.0% Ethanolamine | 537 |
| Betagloss + 1% Dimethylamine | 528 |
| Betagloss + 2% Calcium Carbonate + 1.0% Dimethylamine | 551 |
| Betagloss + 1.0% Diethylenetriamine | 546 |
| Betagloss + 2% Calcium Carbonate + 1.0% Diethylenetriamine | 571 |
| Betagloss + 1.0% Triethylenetetramine | 535 |
| Betagloss + 2% Calcium Carbonate + 1.0% Triethylenetetramine | 546 |

TABLE 5

Normalized light scatter of chemically aggregated kaolinite by application of a cyclic amine, hexamethylenetetramine, and calcium carbonate:

| Material | Light Scatter at 10% Filler Loading |
|---|---|
| Betagloss | 520 |
| Betagloss + 3% Calcium Carbonate | 543 |
| Betagloss + 0.4% Hexamethylenetetramine | 533 |
| Betagloss + 3% Calcium Carbonate + 0.4% Hexamethylenetetramine | 551 |

TABLE 6

Normalized light scatter of chemically aggregated kaolinite with application of ethylenediamine in conjunction with ground calcium carbonate:

| Material | Light Scatter at 10% Filler Loading |
|---|---|
| Betagloss | 521 |
| Betagloss + 0.8% Ethylenediamine | 540 |
| Betagloss + 2.0% Calcium Carbonate + 0.4% Ethylenediamine | 549 |
| Betagloss + 2.0% Calcium Carbonate + 0.8% Ethylenediamine | 561 |

TABLE 7

Normalized light scatter of kaolinite aggregated chemically with the application of various inorganic and organic bases:

| Material | Light Scatter at 10% Filler Loading |
|---|---|
| Betagloss | 504 |
| Betagloss + 3% Barium Carbonate + 0.75% Diethylenetriamine | 541 |
| Betagloss + 3% Barium Carbonate + 0.75% Ethylenediamine | 543 |
| Betagloss + 3% Magnesium Carbonate + 0.75% Ethylenediamine | 551 |
| Betagloss + 3% Magnesium Carbonate + 0.75% Diethylenetriamine | 547 |
| Betagloss + 3% Sodium Carbonate + 0.75% Ethylenediamine | 532 |
| Betagloss + 3% Sodium Carbonate + 0.75% Diethylenetriamine | 526 |

TABLE 8

Normalized sedimentation volume of kaolinite chemically aggregated by application of inorganic carbonates and organic amines:

| Material | Percent Relative Sedimentation Volume |
|---|---|
| Betagloss | 40.0 |
| Betagloss + 3% Magnesium Carbonate + 0.75% Ethylenediamine | 50.4 |
| Betagloss + 3% Magnesium Carbonate + 0.75% Diethylenetriamine | 54.6 |
| Betagloss + 3% Sodium Carbonate + 0.75% Ethylenediamine | 49.5 |
| Betagloss + 3% Sodium Carbonate + 0.75% Diethylenetriamine | 53.5 |

TABLE 9

Relative sedimentation volume of kaolinite chemically aggregated by the application of inorganic metal hydroxides and organic amines:

| Material | Percent Relative Sedimentation Volume |
|---|---|
| Betagloss | 40.0 |
| Betagloss + 3% Calcium Hydroxide + 0.75% Ethylenediamine | 54.1 |
| Betagloss + 3% Calcium Hydroxide + 0.75% Diethylenetriamine | 48.6 |
| Betagloss + 3% Magnesium Hydroxide + 0.75% Ethylenediamine | 49.5 |
| Betagloss + 3% Magnesium Hydroxide + 0.75% Diethylenetriamine | 53.0 |
| Betagloss + 3% Calcium Hydroxide + 1% Urea | 49.4 |

TABLE 10

Normalized scatter of kaolinites chemically aggregated with the application of urea:

| Material | Light Scatter at 10% Filler Loading |
|---|---|
| Betagloss + 1.0% Urea | 525 |
| Betagloss + 1.5% Urea | 529 |
| Betagloss + 3.0% Calcium Carbonate + 1.0% Urea | 540 |
| Betagloss + 3.0% Calcium Carbonate + 1.5% Urea | 539 |

While this invention has been particularly set forth in terms of specifics, it is understood in view of this disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

I claim:

1. A method for producing a kaolin pigment having enhanced light scattering and opacifying properties when incorporated in paper; said method comprising intermixing with a fine particle size kaolin, urea or an organic amine and an aggregation enhancing agent selected from one or more members of the group consisting of any alkali or alkaline earth metal carbonate or alkaline earth metal hydroxide, the enhancing agent being present in quantities to provide from about 5 to 120 millimoles of the enhancing agent metal ion species per 100 parts by weight of kaolin.

2. A method in accordance with claim 1 in which a liquid or solid mono- or polyfunctional amine containing 2 to 6 carbon atoms is used.

3. A method in accordance with claim 2 in which the amine is selected from the group consisting of ethylenediamine, diethylenetriamine and hexamethylenetetramine.

4. A method in accordance with claim 1 wherein said kaolin has a particle size distribution such that from about 70 to 100% by weight thereof is of less than 2 micrometers E.S.D.

5. A method in accordance with claim 1 wherein said kaolin is the product of air classifying a kaolin crude clay to at least as fine as 88% less than 2 micrometers E.S.D.

6. A method in accordance with claim 1 wherein said aqqregation enhancing agent comprises from about 0.5 to about 12% by weight of the kaolin, of a particulate alkaline earth metal carbonate or hydroxide.

7. A method in accordance with claim 6 wherein said aggregation enhancing agent comprises calcium carbonate.

8. A method in accordance with claim 7 wherein calcium carbonate is used in an amount of about 1.5 to 4% by weight of the kaolin.

9. A method in accordance with claim 1 wherein said urea or organic amine is added in an amount ranging from about 0.25 weight percent to about 2 weight percent based on the weight of the kaolin.

10. A method in accordance with claim 1 in which a wet kaolin is spray dried and then the urea or amine and the carbonate or hydroxide are added thereto.

11. A method in accordance with claim 1 in which one component of the desired bases is added to a wet kaolin prior to spray drying it.

12. A high light scattering pigment for use in paper and paperboard products, comprising uncalcined porous aggregates formed from an intermixture of a fine particle size kaolin; from 8 to 20 lbs/ton kaolin of urea or an organic amine, and an aggregation enhancing agent selected from one or more members of the group consisting of any alkaline earth metal carbonate or hydroxide, and alkali metal carbonate, the enhancing agent being present in quantities to provide from about 5 to 120 millimoles of the enhancing agent metal ion species per 100 parts by weight of kaolin.

13. A method for producing aggregated porous kaolin pigments, for use in paper filling and coating, comprising mixing a fine particle size kaolin with urea or an organic amine, and an aggregation enhancing agent selected from one or more members of the group consisting of the alkali or alkaline earth metal carbonates, and alkaline earth metal hydroxides, the enhancing agent being present in quantities to provide from about 5 to 120 millimoles of the enhancing agent metal ion species per 100 parts by weight of kaolin, and said urea or organic amine being added in an amount ranging from about 0.25 weight percent to about 2 weight percent based on the weight of the kaolin.

* * * * *